United States Patent
Fleischauer et al.

[15] 3,650,375
[45] Mar. 21, 1972

[54] DRIVE FOR ROLLER CONVEYORS

[72] Inventors: Fred J. Fleischauer, Oakmont, Pa.; Theodore A. Hammond, Grand Haven, Mich.

[73] Assignees: Ermanco Incorporated, Grand Haven, Mich. by said Hammond; General Logistics Corporation, Oakmont, Pa., by said Fleischauer

[22] Filed: May 5, 1969

[21] Appl. No.: 842,043

[52] U.S. Cl. .................. 198/127 R, 74/216.5, 74/230.5
[51] Int. Cl. ........................................................ B65g 13/02
[58] Field of Search ............. 298/127; 74/216.5, 72, 230.5; 193/35 A; 64/30 R

[56] References Cited

UNITED STATES PATENTS

| 706,211 | 8/1902 | Apelt | 74/230.5 |
| 2,051,634 | 8/1936 | Carroll et al. | 198/127 X |
| 2,596,798 | 5/1952 | Thompson | 198/127 X |
| 3,458,027 | 7/1969 | Matthews | 193/35 A X |
| 3,457,733 | 7/1969 | Bangerter et al. | 64/30 |

FOREIGN PATENTS OR APPLICATIONS 152,470  11/1955  Sweden

*Primary Examiner*—Richard E. Aegerter
*Assistant Examiner*—Douglas D. Watts
*Attorney*—Wolfe, Hubbard, Leydig, Voit & Osann This application filed under Rule 47.

[57] ABSTRACT

A drive for a live-roller conveyor system is described in which individual rollers are driven from a powered cross-shaft through an elastomeric belt having a circular cross-section. A spool-shaped sliding pulley is provided for one shaft which floats axially to seek its optimum driving position, with the spool preferably being in the shape of a hyperboloid of revolution, broken at its center striction line with the end sections spaced apart by a cylindrical portion of a length sufficient to accommodate the helical wrap of the driving band.

6 Claims, 5 Drawing Figures

Patented March 21, 1972

3,650,375

INVENTORS:
FRED J. FLEISHAUER
THEODORE A. HAMMOND
BY
Wolfe, Hubbard, Voit & Osann
ATTORNEYS.

DRIVE FOR ROLLER CONVEYORS

DESCRIPTION OF THE INVENTION

This invention relates to conveyors and in particular to roller conveyors used to transport individual objects along a pass line. In its principal aspect the invention concerns a belt drive for driving or braking individual conveyor rollers.

A principal object of the present invention is to provide a band or belt drive for the individual rollers of a live-roller conveyor in which excessive rubbing, wear, and heat buildup are minimized or eliminated, and in which the belt is enabled to seek its optimum driving position for each load condition encountered during conveyor operation.

As another object, it is intended to provide a conveyor drive for use with torque-limiting drive systems employing an O-ring looped about drive pulleys carried by shafts crossed at an angle of up to 90°, in which the torque-limiting function is provided by a slippable friction connection between each pulley and its shaft.

Other objects and advantages of the invention will become apparent from reading the following detailed description in conjunction with the drawings, in which.

While the invention is described in connection with certain illustrative preferred embodiments, it will be understood that the invention is not restricted to the particular uses and applications shown and described herein, but on the contrary may be utilized in all shaft drive applications where optimum driving conditions and minimum belt wear are desired in connection with torque-limiting devices.

Figure 1:
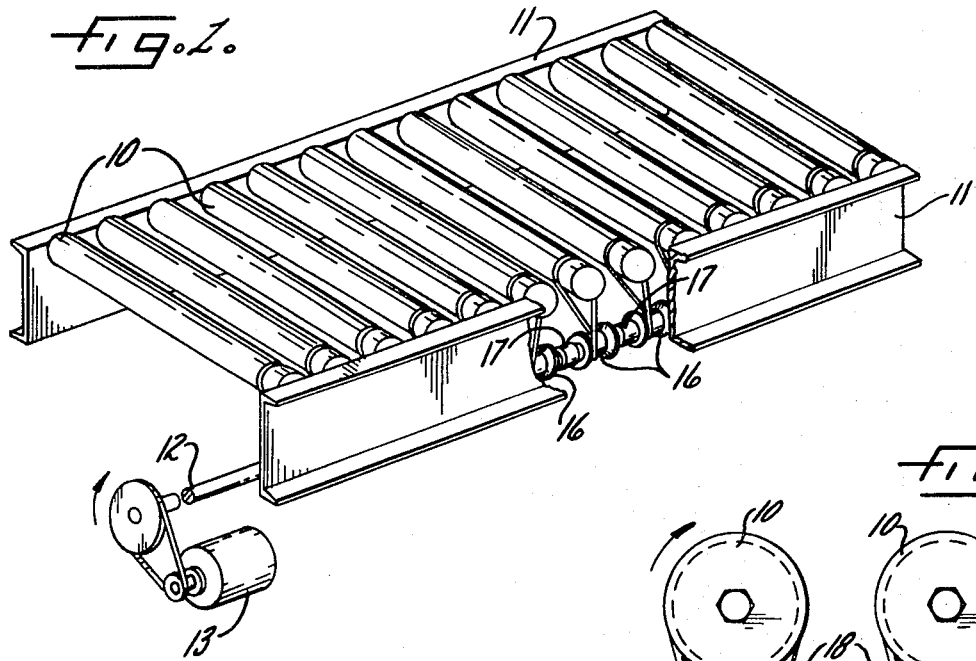
FIG. 1 shows in perspective a roller conveyor driven from a crossed drive shaft through O-rings exemplifying the present invention.

Turning now to the drawings, there is shown in FIG. 1 in simplified form a portion of an exemplary live-roller conveyor in which individually powered transverse rollers 10 are supported for rotation on conveyor rails 11, and are each individually driven from a drive shaft 12 positioned beneath the pass line of conveyor. The drive shaft 12 is aligned in the direction of conveyor movement, being driven by a motor 13.

Spaced along the length of the drive shaft 12 are a plurality of spool-shaped drive pulleys or sleeves 16, one for each roller 10. Alternatively or in combination, similar sleeves (not shown) can be carried by the individual rollers 10. Interposed between each pair of pulleys 16 on the shaft 12 is a spacer member 17. The pulleys 16 are not rigidly clamped to the shaft 12, but are instead provided with a small amount of clearance so that each may slip when the torque needed to drive the individual roller 10 associated with that pulley exceeds a predetermined value. The pulleys 16 are thus rotatably and slidingly mounted on the shaft 12. Power is transferred from each pulley 16 to its associated roller 10 through a resilient belt 18, preferably of circular cross section such as an O-ring. The belt 18 is preferably of a resilient elastomeric material so that it can stretch under tension in use. The belt 18 is looped around the pulley 16, turned about 90°, and looped over a corresponding groove at one end of the roller 10.

It is an advantage of the invention that the drive shaft 12 need not be aligned at 90° to the individual powered rollers 10 as illustrated, but may instead be positioned at any desired angle, including parallel. The drive belt 18 will normally assume a position near the line of minimum distance between the shafts, and the belt 18 resides in this position when at rest.

As a principal feature of the invention, the drive pulley 16 is enabled to shift axially along the drive shaft 12 to accommodate itself to an optimum driving position for each load condition of the belt 18. As viewed in FIG. 2, the driven roller 10 is assumed to be driven in a clockwise direction, such that the side of the drive shaft 12 facing the viewer turns downwardly. In this condition the right-hand or entering portion of the belt 18 is under greater tension than the left-hand or leaving portion, with respect to the drive pulley 16.

Under no-load or idling conditions, the belt 18 is preferably provided with a certain preload which is determined by the spacing of the shaft axes and the length, diameter and modulus of elasticity of the O-ring 18. The preload is selected to provide a sufficient amount of initial driving friction between the belt 18 and the drive pulley 16 when in a rest position or when the conveyor is started, as shown in solid lines in FIG. 2.

Figure 2:
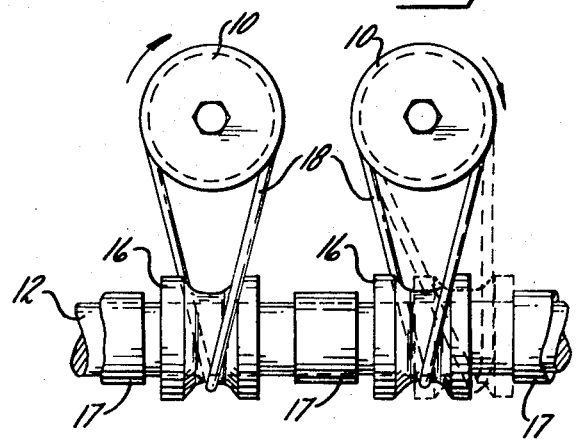
FIG. 2 is a fragmentary side elevation of the drive elements of the conveyor of FIG. 1.

During free running of the conveyor under light load or no-load conditions, the pulley 16 and belt 18 shift downstream of conveyor movement; assuming relative positions substantially as shown in dashed lines in FIG. 2, pulling the entering side of the belt past the vertical, depending on preload and the friction characteristics of the belt and pulleys. When a heavy driving load is encountered, however, combination of slippage and the difference in tension between the entering and leaving portions of the belt 18 causes each pulley 16 to shift axially upstream back along the drive shaft 12, drawn by the tensioned side of the belt, or to the left as viewed in FIG. 2. Under such conditions of maximum load or slippage the drive pulley 16 may again draw back to the solid lines.

The phenomena of axial pulley shift is not completely understood, but it has been observed that the tensioning effect on the entering side of the belt 18 results in an imbalance of axial forces on the pulley 16, causing it to tend to shift along the drive shaft 12. It is even possible for the taut side of the belt 18 to move past the vertical such that both sides of the band 18 will define acute angles to the shaft 12 on the same side of the vertical intersecting axis.

It is believed that this mechanism is at least in part due to the play between the frictionally driven pulley 16 and the moving shaft 12. Since the sleeve can cock slightly as a result of this small amount of freedom, there is a tendency to creep or walk along the shaft 12, much like the tendency of a conventional flat drive belt to climb to the high side of a crowned pulley. Another observed phenomena is that the belt 18 becomes twisted upon rolling across the cylindrical center portion of the pulley 16. So long as a rolling motion is present, rather than the belt slipping axially along the pulley 12, wear and degradation of the belt through the buildup of frictional heat are reduced or eliminated.

It is known, however, that the circular cross section of the O-ring belt 18 facilitates rolling across the cylindrical portion of the surface of the pulley 16, thereby assuming a generally helical configuration. This freedom to rotate prevents unnecessary sliding and stretching of the belt 18 and allows it to assume the most favorable configuration for passing over the pulley 16. By eliminating such slipping and stretching, frictional losses and internal heat buildup are reduced or eliminated so that belt life is greatly increased and changes in belt shape and system geometry are effectively eliminated for the life of the belt.

The shifting effect of the pulley 16 is used to advantage in the present invention by allowing the shift in pulley or sleeve position to add additional preload to the belt 18, thereby increasing the effectiveness of the drive. As the preload increases the friction between the belt 18 and the surface of the pulley 16 is enhanced, and a similar effect occurs in the groove in a driven rollers 10. So long as a solid driving connection between the drive shaft 12 and the pulley 16 is maintained, increasing loads will increase the driving effectiveness of the belt.

A further advantage of the invention occurs when, as in the preferred embodiment, a torque-limiting friction drive is used to connect the pulley 16 to the drive shaft 12. Under ordinary operating conditions, the friction coupling between the shaft 12 and the various loose-fitting pulleys 16 is sufficient to provide non-slipping power transmission to each roller 10. However, should an individual roller 10 require a driving force exceeding a predetermined value, the formerly solid friction connection between the shaft 12 and its associated pulley 16 will slip, allowing the roller 10 to stop while the shaft 12 continues to rotate within the hollow pulley 16 as it continues to drive the remaining rollers in the conveyor. When the excessive load on the one roller 10 is removed, it too again begins to turn.

In a typical roller conveyor constructed according to the invention, the diameter of the drive shaft 12 is 1 inch, and the pulley 16 fits over the shaft 12 with a clearance of about 0.005 inches. The inner diameter of the pulley 16, at its narrowest point, is 1 ½ inches, and the distances between the center lines of the drive shaft 12 and the rollers 10 is 5 inches. The shafts are disposed at 90°, as viewed along the intersecting axis at which point the belt 18 is located.

For operation of the conveyor in only the forward direction it is necessary only to allow axial movement of the pulley 16 in the direction of the taut side of the belt 18. This is the right side as viewed in the embodiment illustrated in FIG. 2, where the advancing side of the belt 18 approaches the pulley 16. For such one-direction operation, it is possible to place a circle clip or retaining ring (not shown) on the shaft next to the slack side of the belt 18 while leaving freedom of movement in the opposite direction. If the conveyor is to be reversed, then freedom of axial movement must also be provided for the pulley 16 on the left side as well.

In positive drive applications the pulley 16 can be retained to the shaft 12 by a loose-fitting axial spline or key. But in applications where a torque-limiting friction drive is described, then the driving force is preferably supplied through a slippable connection between the pulley 16 and the drive shaft 12, as previously described. In the latter embodiment it will be seen that the transmitted driving force is dependent in the first instance on friction produced by the initial preload of the belt system. As speed and load initially increase, the sideways movement of the pulley 16 along the shaft 12 will tend to increase the effective center distance of the pulleys, shifting from the ideal minimum length distance which is along an axis intersecting the axes of both the drive shaft 12 and roller 10 at right angles. This, in turn, increases the net tension of the belt 18, and increases the frictional driving force available before the pulley 16 initially slips on the drive shaft 12. As soon as slip occurs, however, the static coefficient of friction is replaced by a kinetic coefficient of friction which is lower, thereby reducing the force which formerly urged the pulley 16 to the right as viewed in FIG. 2. The pulley 16 therefore returns toward its original position with a consequent reduction in friction-producing tension. If the load remains which caused the pulley 16 to slip in the first instance, the reduced friction now available will be less than that maximum value which was formerly obtained just prior to slipping. Since the torque available to restore motion to a stalled roller 10 is less than the former level of force which broke the frictional connection with the drive shaft 12, the stall torque on the roller 10 must be substantially reduced or removed before it will start again.

Figure 3:
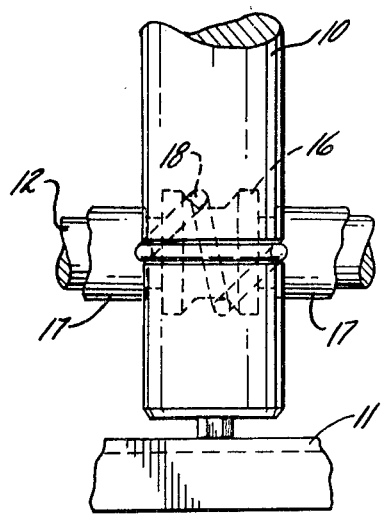
FIG. 3 is a plan view along an axis perpendicular to both the drive and driven rollers of FIG. 2, showing the path of belt travel.
Figure 4:
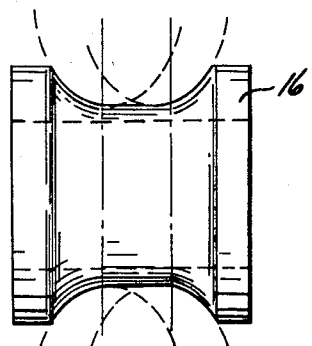
FIG. 4 is an enlarged side elevation in section of a slippable friction drive pulley constructed according to the present invention.

The shape of the pulley 16 is derived from the theoretical considerations of a belt 18 passing over a rotating cylindrical surface. As may be seen from FIG. 3, the fact that the band 18 is turned through an angle between the pulley 16 and roller 10 causes it to assume a helical shape where it turns around the cylindrical center section of the pulley 16. The length of the cylindrical center portion desirably is substantially one-half the pitch length of this helix, or slightly more. It will be seen that the points of entering and leaving of the belt 18 are not directly opposite one another on the pulley 16, but encompass slightly more than 180° of spool rotation. However, a center cylindrical portion length of one-half the helix pitch length has been found sufficient for design purposes.

At the ends of the pulley 16 are flanges which serve to guide the entering and leaving portions of the belt 18 and prevent it from running off the ends of the pulley or sleeve.

Desirably, the flanges are shaped to provide minimal interference with the belt strands, and should be conical, rounded, or otherwise shaped to avoid undue belt wear while preventing the belt from running up and over the flanges 16. In the preferred configuration the flange surfaces are geometrical figures known as hyperboloids of revolution of one sheet, being defined as the surface generated by rotating the hyperbola $$(y^2/b^2) - (x^2/a^2) = 1$$

about the X-axis. In the theoretically correct hyperboloid of revolution the point of minimum diameter is known as the striction line, and it is at this point that the hyperboloid surface is split and the cylindrical center portion is added to account for the helical wrap of the belt 18 as it encircles the pulley 16. The ratio $b/a$ is equal to the diameter of the central portion of the pulley 16 divided by the pitch length of the helix, and since the helix varies for varying distances between the shafts 10, 12, it will be seen that the spool shape of the pulley 16 is thereby determined by this ratio.

The flange portions of the pulley 16, if placed together without being separated by the cylindrical central portion, would theoretically conform in this example to a hyperboloid of revolution of one sheet. Such a geometrical figure can be constructed from a plurality of straight lines as may be demonstrated by stringing threads between two coaxial discs, and rotating one of the discs slightly to draw in the center at the striction line. The entering side of the belt 18 is parallel to one such straight line thread and the leaving portion of the belt is parallel to another. The belt is thus tangent to the hyperboloid where it contacts the surface at both approach and exit. (While this theoretical approximation is sufficiently accurate for design purposes, it should be noted that it does not take into consideration the finite thickness of the belt 18.)

The flanges of the pulley 16 are continued outward until the outer diameter is sufficiently larger than the diameter of the cylindrical central portion so that no possibility is present of the belt 18 running off. In practice, it has been found that the difference between the flange radius and the radius of the central portion should be about twice the thickness of the O-ring belt 18. When a 3/16-inch-diameter O-ring is used the additional flange radius is approximately three-eighth inch.

Figure 5:
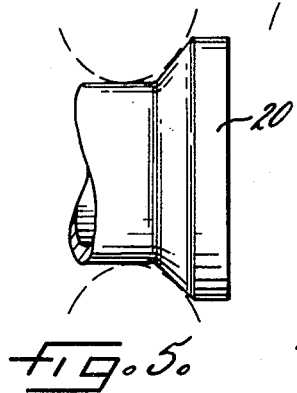
FIG. 5 is a side elevation of an alternate drive pulley configuration.

It has been found in practice that a workable pulley 20 (FIG. 5) for many applications can also be constructed by making conical flanges which only roughly approximate the theoretically ideal hyperboloid of revolution. In this case, the conical shape is defined by the surface generated by rotating the asymptotic lines $$y = (b/a)x \text{ and } y = -(b/a)x$$

about the X-axis. The values of $x$, $y$, and $b/a$ are as previously noted. The intersection of the conical flanges with the cylindrical center portion is preferably smoothed with a fillet, as shown in FIG. 5. It will be noted that the conical approximation to the hyperboloid of revolution of one sheet, when seen in a plane intersecting the axis of the drive shaft 12, is asymptotic to the hyperbolic surface. It is also necessary to extend the cylindrical center portion somewhat to meet the conical surface, resulting an effectively longer central portion than the theoretically predicted one-half of the helical pitch length.

A further modification in the shapes given by the foregoing equations is desirable to account for the shift of the pulley 16 along the drive shaft 12 under load conditions. For this purpose, the flanges are made somewhat shallower than would be theoretically predicted, so that the leaving side of the belt 18 is not kinked or flexed over the edge of the flange as it turns back toward the driven roller 10. The entering portion of the belt 12 approaches at a steeper angle to intersecting axis as a result of the shift and is therefore not quite tangent to its adjacent flange but spaced from it. At maximum shift the angle of the adjacent flange face (with a hyperbolic, conical, or other surface) relative to the pulley axis is desirably equal to the included angle between each belt strand and an axial line drawn from the point of initial belt contact with the cylindrical center surface. The pulley 16 is preferably made somewhat shallower than would be predicted theoretically in order to allow the sideways shifting movement along the shaft 12 to provide the previously mentioned self-adjusting tensioning effect.

As a result of the present invention, there is in effect a self-adjusting tensioning tensioning in the belt drive which provides increased frictional driving force as the driven conveyor load increases, but which is reduced immediately to a minimum when a roller 10 is stopped and slippage occurs between the pulley 16 and the drive shaft 12. In the case of other belt drives, other tensioning means are necessary, such as an accessory tensioning pulley. Because of the near-optimum shape of the pulley 16 itself, excessive belt wear is avoided and substantially the only relative movement of the belt 18 on traveling around the pulley 16 is a rolling motion. Because the flanges of the pulley are suitably sloped, kinks or points of excessive flexing are avoided, thus avoiding internal heat buildup because of hysteresis effects. If desired, the spacer members 17 can be positioned to limit axial movement to limit the maximum amount of tension obtained by this means and to provide a precisely controlled limit to the frictional driving torque.

The circumferential groove around the driven roller 10 can be a simple flat-bottomed groove a trapezoidal shape, or of the same general shapes as described in connection with the pulley 16. The axially shiftable pulley feature may also be employed to advantage as mounted on the rollers (not shown), with the pulley being supported on an axial extension of the roller or at some point of reduced diameter along the length of the roller. With such a slippable pulley on the rollers, the drive shaft may be provided with fixed pulleys without disadvantage.

It has been found that even with the optimum design of the present invention the O-rings 18 will wear in long use, or will develop a certain amount of stretch with age. However, the self-adjusting feature of the invention involving axial pulley shifts on the drive shaft substantially eliminates any external means to compensate for these effects. A roller conveyor constructed according to the present invention can therefore be used throughout the useful life of the individual O-rings 18 without adjustment or maintenance in this regard.

The following is claimed as invention:

1. A conveyor drive comprising in combination, a drive shaft, a driven shaft spaced from the drive shaft and at an angle thereto, one shaft having a fixed pulley and the other shaft having a floating pulley rotatably mounted thereon for friction drive, said floating pulley being axially movable on said other shaft, an endless resilient belt looped about both pulleys, the floating pulley having a surface as defined by a hyperboloid of revolution of one sheet, separated at its striction line and spaced apart by a cylindrical central portion having a length substantially equal to one-half the free helical pitch of the band path on said cylindrical portion, the hyperboloid defining a surface of revolution tangent to the entering and leaving portions of the band.

2. A conveyor drive as defined in claim 1 in which the hyperboloid has a shape defined in cross section by the relation $(y^2/b^2) - (x^2/a^2) = 1$.

3. A conveyor drive as defined in claim 1 in which the radial width of the flanges at the end of the floating pulley is at least twice the diameter of the resilient band.

4. A conveyor drive as defined in claim 1 in which the driven and drive shafts are spaced apart to preload the flexible band when in a nondriving condition.

5. A conveyor drive comprising a drive shaft, a driven shaft spaced from the drive shaft and at an angle thereto, a pulley rotatably carried for slippable friction drive on at least one of said shafts, an endless transmission belt looped about said pulley and the other of said shafts, said pulley being frictionally coupled to said shaft to limit the amount of torque transmitted between said shaft, and said pulley having a surface as defined by a hyperboloid of revolution of one sheet, separated at its striction line and spaced apart by a cylindrical central portion having a length substantially equal to one half the free helical pitch of the band path on said cylindrical portion, the hyperboloid defining a surface of revolution tangent to the entering and leaving portions of the band.

6. A conveyor for transporting and accumulating a plurality of articles comprising a plurality of spaced individually rotatable rollers, means for rotatably mounting said rollers to define a pass line extending along the length of said conveyor, a drive shaft spaced from said rollers and disposed at an angle thereto, slippable transmission means connecting each of said rotatable rollers to said drive shaft, said slippable transmission means including a pulley and an endless belt for each of said rotatable rollers, said pulleys each being rotatable and axially slidably mounted for friction drive on said drive shaft, said belts each engaging one of said pulleys and said associated roller, said pulleys being formed with a pair of flanges which define hyperbolic shaped surfaces for receiving a helical belt wrap, and a spacer sleeve mounted on said drive shaft between each pulley for limiting to a determined range the axial sliding movement of said pulley relative to said shaft.

* * * * *

PO-1050
(5/69)

UNITED STATES PATENT OFFICE
CERTIFICATE OF CORRECTION

Patent No. 3,650,375           Dated  March 21, 1972

Inventor(s)  Fred J. Fleischauer & Theodore A. Hammond

It is certified that error appears in the above-identified patent and that said Letters Patent are hereby corrected as shown below:

Col. 3, line 16, "distances" should be --distance--

Col. 5, line 9, "tensioning tensioning" should be --tensioning action--

Col. 5, line 27, "groove a" should be --groove of--

Col. 5, line 30, after "rollers" insert --10--

Claim 5, line 6, after "said" insert --one--

Claim 5, line 7, "shaft" should be --shafts--

D Signed and sealed this 19th day of September 1972.

(SEAL)
Attest:

EDWARD M. FLETCHER, JR.
Attesting Officer

ROBERT GOTTSCHALK
Commissioner of Patents